Feb. 14, 1928.
W. H. JARDINE
1,659,362
DAMPER ACTUATING MECHANISM
Filed March 22, 1927    2 Sheets-Sheet 1
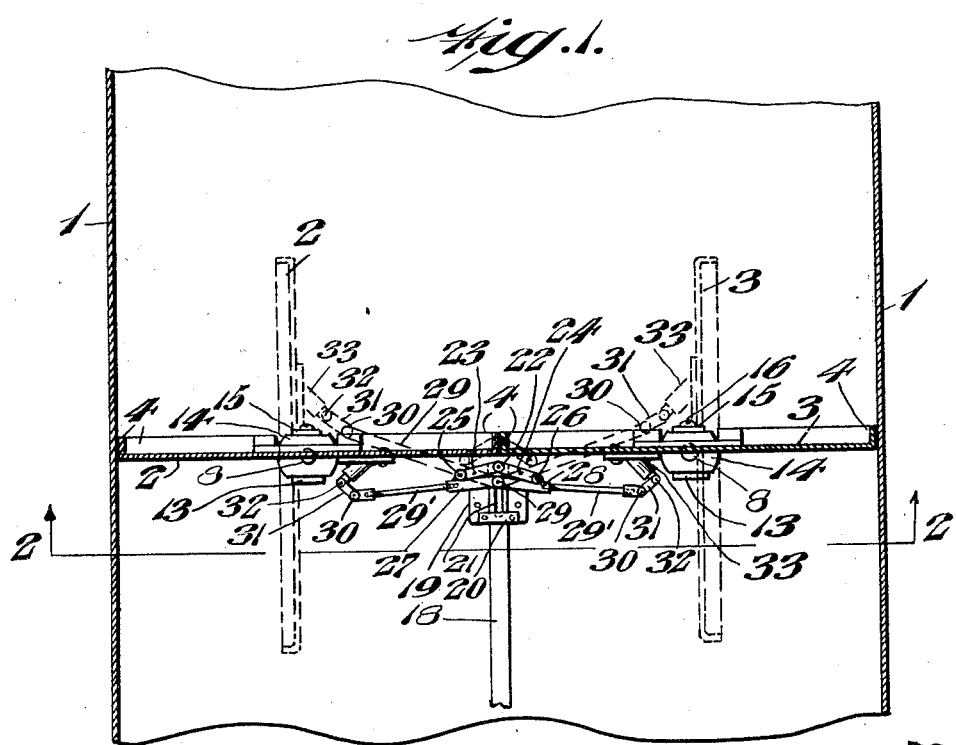

Feb. 14, 1928.  
W. H. JARDINE  
1,659,362
DAMPER ACTUATING MECHANISM
Filed March 22, 1927     2 Sheets-Sheet 2
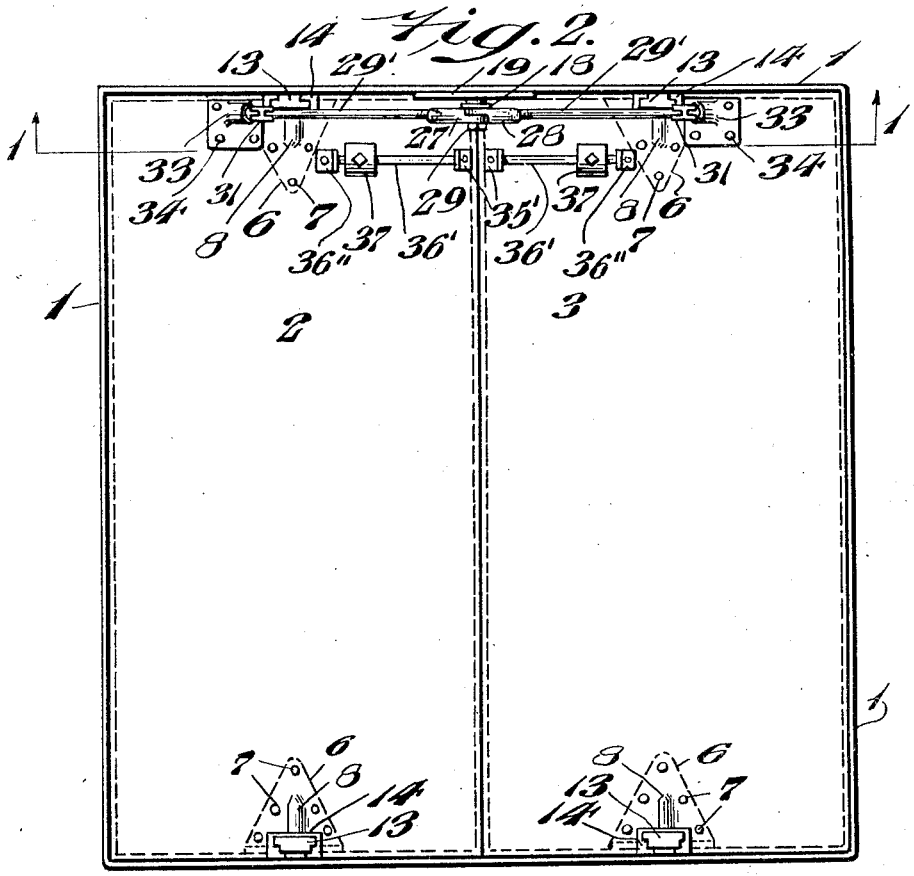
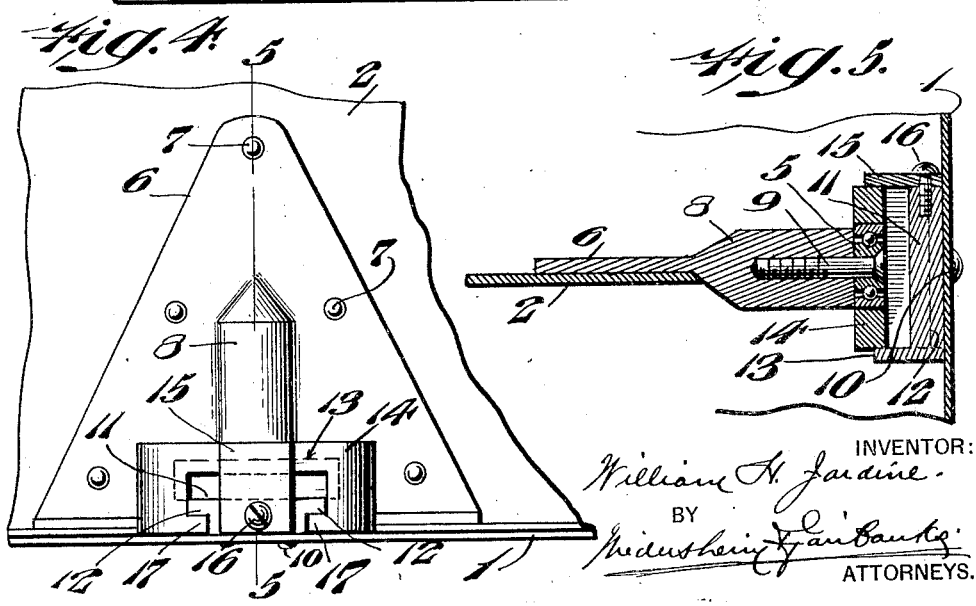
INVENTOR:  
William H. Jardine.  
BY  
ATTORNEYS.

Patented Feb. 14, 1928.

1,659,362

UNITED STATES PATENT OFFICE.

WILLIAM H. JARDINE, OF PHILADELPHIA, PENNSYLVANIA.

DAMPER-ACTUATING MECHANISM.

Application filed March 22, 1927. Serial No. 177,257.

This invention generally stated relates to a ventilating apparatus and has more especial relation to flue connection therebelow in the form of a damper regulating member.

The leading object of the present invention may be said to reside in the provison of simple, efficient and comparatively inexpensive damper mechanism for a flue in which the damper parts may be manually or automatically operated in order to increase or decrease upward air movement through the flue.

A further object of the present invention is to provide a flue in which a pair of damper members are mounted upon ball bearings in order to readily respond to either mechanical or automatic operating means.

A still further object of the present invention is to provide a pair of damper parts, oppositely disposed upon ball bearing connections, which members are operated either manually or automatically through vertical, movable toggle joint connections.

Other and further objects of the present invention reside in the provision of general details of construction and arrangement and connection of parts for attaining the results sought by the foregoing objects.

The invention consists of the novel construction hereinafter described and finally claimed.

The nature, characteristic features and scope of the invention will be more fully understood from the following description taken in connection with the accompanying drawings, and in which:

Fig. 1, is a view in central section, fragmentary in nature, illustrating a flue with the damper members in closed position, as shown in full lines, and with the damper members in open position, as shown in dotted lines, said figure being taken approximately upon the line 1—1 of Fig. 2.

Fig. 2, is a view in horizontal section taken upon the line 2—2 of Fig. 1, viewed in the direction of the arrows.

Fig. 3, is a fragmentary view upon an enlarged scale illustrating the toggle joint arrangement of parts shown in Figs. 1 and 2.

Fig. 4, is a fragmentary view in plan of a ball bearing connection for a damper member.

Fig. 5, is a fragmentary view, in section, taken upon the line 5—5 of Fig. 4.

Fig. 6, is a detailed view of certain parts hereinafter referred to.

Fig. 7, is a view of parts co-operating with the parts shown in Fig. 6 and hereinafter referred to; and Fig. 8, is a view in side elevation of certain of the parts shown in Fig. 3.

For the purpose of illustrating my invention I have shown in the accompanying drawings one form thereof which is at present preferred by me, since the same has been found in practice to give satisfactory and reliable results, although it is to be understood that the various instrumentalities of which my invention consists can be variously arranged and organized and that my invention is not limited to the precise arrangement and organization of the instrumentalities as herein shown and described.

Referring to the drawings in detail, reference numeral 1 represents a flue which as shown in Fig. 2, is of rectangular cross-section. Pivotally arranged within the flue are a pair of oppositely disposed damper members designated 2 and 3 respectively. These damper members each comprise a plate having a flanged portion 4 in order to provide a relatively dished-shape arrangement, as clearly shown in Fig. 1. Each of the damper members 2 and 3 is pivotally connected at its center, best seen in Fig. 1. The pivot points are ball bearing in nature, as best seen in Fig. 3, which ball bearing connections are designated 5. In order to support the ball bearings 5, which ball bearings it may be stated are oppositely disposed as to the damper members 2 and 3 respectively, as clearly shown in Fig. 2, there is secured to the top of each of the damper members 2 and 3 a plate 6, relatively triangular in shape, which plates are riveted as at 7. These plates 6 in turn have enlarged parts 8, see Figs. 4 and 5, which parts 8 are internally screw-threaded to receive screws 9 so that the ball bearing or anti-friction members 5 may be secured with respect to the enlargements 8. In practice these plates 6 are secured to the walls of the flue 1, in the following manner: Riveted to the wall of the flue 1, as at 10, is a member 11, best seen in Fig. 6, which member is grooved as at 12 and is provided on its underside with a flange 13. Fitted over the flanged part 12 of member 11 is another member 13, see Fig. 7, in which the ball bearing or anti-friction member 5 rests upon the flanged part 13, as clearly illustrated in Fig. 5. In order to maintain the ball bearing or anti-friction bearing 5 with proper relation with respect to ledge 13, use is made of the plate 15 secured as at 16 to member 11. In the connection, it may be stated that the ledges 17 of member 14 cooperatively engage the grooves 12 of member 11 in order to sustain the parts in cooperative relation. The damper members 2 and 3 having now been described, a description will be given of the means and manner of operating these damper members. These members 2 and 3 are primarily operated by means of a vertically disposed rod 18, best seen in Figs. 1 and 3, and this rod, it may be stated, may be manually operated or automatically operated as for instance through a thermostatic mechanism. Since both manual mechanisms and thermostatic mechanism may be of any preferred type, illustration thereof has not been made in the present case since it is believed that it is apparent to those skilled in the art as to what may be employed.

Fixed to one side wall of the flue 1, as by rivets or the like, is a plate 19, see Figs. 2 and 3. Arranged upon said plate there is a vertically slidable rod 18 which passes through a keeper 20. The upper portion of this rod 18 is slotted as at 21, reference now being had particularly to Fig. 3. The top of said rod 18 has pivoted thereto as at 22 a pair of oppositely disposed links 23 and 24. These links in turn have pivotal connection as at 25 and 26 with members 27 and 28 pivoted together as at 29 and slidable through slot 21 of rod 18. Thus, as the rod 18 is, for example, moved upwardly, the slotted part 21 of said rod moves freely with respect to pivot joint 29, but the free end of said rod 18 causes the links 23 and 24 to pull upwardly the members 27 and 28, which position is clearly shown in Fig. 3. Obviously the reverse movement of rod 18 causes said members 27 and 28 to be moved downwardly. The members 27 and 28 carry rods 29', which rods 29' in turn have pivotal connection as at 30 with links 31, which links 31 have pivotal connection as at 32 with sockets 33 riveted as at 34 to the underside of the damper members 2 and 3. It may be stated that the plate 19 has formed integral therewith, as at 35, a lug with which the slot 21 has movable relation. This lug 35 has extending horizontally therefrom a screw-threaded pin 36 with which the pivotal connection 29 may be effected. This structure is very clearly shown in Fig. 8. To counter-balance the damper members 2 and 3 I make use of a lug 35' secured to each of said members 1 and 2 to which is fixed a rod 36' which in turn carries a counter-balance 37 adjustable along said rod 36', a bearing 36" being provided for the outer end of each rod 36'.

It will be understood that while I have shown and described the flue as being rectangular in cross-section and the co-operating damper sections as being rectilinear, it will be apparent that the flue and the damper members may be of any other contour as round, oval or the like without departing from the spirit of my invention.

It will be further apparent that the damper operating mechanism can be located at other points than that shown, if desired, without departing from the spirit of my invention. The members 29' are preferably made tubular having their ends screw-threaded into their respective connections, so that any slight adjustment which may be necessary is readily provided for.

It will now be apparent that I have devised a novel and useful construction of damper actuating mechanism which embodies the features of advantage enumerated as desirable in the statement of the invention and the above description and while I have in the present instance shown and described the preferred embodiment thereof which has been found in practice to give satisfactory and reliable results, it is to be understood that the same is susceptible of modification in various particulars without departing from the spirit or scope of the invention or sacrificing any of its advantages.

Having thus described my invention, what what I claim as new and desire to secure by Letters Patent, is:

1. A device of the character stated, comprising a flue, a pair of coacting, opposed, damper members each centrally pivoted in said flue and arranged to move in an arc of a circle, a plate fixed to one side wall of said flue, said plate having a keeper, a vertically slotted rod vertically slidable through the keeper of said plate, damper moving members, a toggle joint connection comprising a pair of links pivoted to said rod at their outer ends and pivoted to said damper moving members at their inner ends, and means for connecting the outer ends of said damper moving members with respect to said dampers.

2. A device of the character stated, comprising a flue, a pair of coacting, opposed, damper members each centrally pivoted in said flue and arranged to move in an arc of a circle, a plate fixed to one side wall of said flue, said plate having a keeper, a vertically slotted rod vertically slidable through the keeper of said plate, damper moving members each having an extension, a toggle joint connection comprising a pair of links pivoted to said rod at their outer ends and pivoted to extensions upon said damper moving members at their inner ends, and means including links for connecting the outer ends of said damper moving members with respect to said dampers.

WILLIAM H. JARDINE.